US009665234B2

(12) United States Patent
Lafreniere et al.

(10) Patent No.: US 9,665,234 B2
(45) Date of Patent: May 30, 2017

(54) COMMUNITY ENHANCED TUTORIALS: IMPROVING TUTORIALS WITH MULTIPLE DEMONSTRATIONS

(71) Applicant: AUTODESK, INC., San Rafael, CA (US)

(72) Inventors: Benjamin Lafreniere, Kitchener (CA); Tovi Grossman, Toronto (CA); George Fitzmaurice, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 232 days.

(21) Appl. No.: 13/864,194

(22) Filed: Apr. 16, 2013

(65) Prior Publication Data

US 2014/0310596 A1   Oct. 16, 2014

(51) Int. Cl.
| | | |
|---|---|---|
| *G06F 3/048* | (2013.01) | |
| *G06F 3/0481* | (2013.01) | |
| *G09B 5/00* | (2006.01) | |
| *G09B 5/06* | (2006.01) | |
| *G09B 7/02* | (2006.01) | |

(52) U.S. Cl.
CPC ............. *G06F 3/0481* (2013.01); *G09B 5/00* (2013.01); *G09B 5/06* (2013.01); *G09B 7/02* (2013.01)

(58) Field of Classification Search
USPC ........................................................ 715/708
See application file for complete search history.

(56) References Cited

U.S. PATENT DOCUMENTS

| | | | | | |
|---|---|---|---|---|---|
| 5,442,759 | A | * | 8/1995 | Chiang ................ | G06Q 50/205 434/118 |
| 5,481,667 | A | * | 1/1996 | Bieniek ................. | G06F 9/4446 715/709 |
| 5,577,186 | A | * | 11/1996 | Mann, II ............ | G09B 19/0053 715/201 |
| 5,597,312 | A | * | 1/1997 | Bloom ..................... | G09B 7/04 434/118 |
| 6,099,317 | A | * | 8/2000 | Bullwinkel ......... | G06F 9/45512 434/118 |
| 2004/0181751 | A1 | * | 9/2004 | Frumusa .................. | G09B 7/02 715/234 |
| 2008/0195946 | A1 | * | 8/2008 | Peri-Glass ............ | G06F 9/4446 715/715 |
| 2009/0123903 | A1 | * | 5/2009 | Weitenberner ......... | G09B 19/00 434/323 |
| 2011/0086686 | A1 | * | 4/2011 | Avent ...................... | A63F 13/10 463/6 |

* cited by examiner

*Primary Examiner* — Matthew Ell
(74) *Attorney, Agent, or Firm* — Artegis Law Group, LLP

(57) ABSTRACT

Techniques are disclosed for presenting an online tutorial. A method for presenting an online tutorial may generally include providing an interactive tutorial to a user. The interactive tutorial may include both tutorial content specifying steps to perform a task with an application and an application interface associated with the application used to perform the task. This method may also include recording the user interacting with the application interface to perform the task according to the steps specified by the interactive tutorial and augmenting the tutorial content with the recorded user interaction.

23 Claims, 8 Drawing Sheets

COMMUNITY ENHANCED TUTORIALS: IMPROVING TUTORIALS WITH MULTIPLE DEMONSTRATIONS

BACKGROUND OF THE INVENTION

Field of the Invention

Embodiments of the invention generally relate to computer software and, more specifically, to a web-based tutorial system configured to integrate a full featured application into a community enhanced web-based tutorial.

Description of the Related Art

A wide variety of software applications are currently available to end-users, including computer-aided design (CAD) applications, computer graphics applications, animation applications, word processing applications, and computer programming applications, among others. Despite advances in making complex applications easier to operate, learning how to use such applications can still be daunting. More complex applications, such as CAD and computer graphics applications, often have thousands of commands or functions to choose from, and multiple ways for an end-user to combine the different functions into workflows to complete a particular task. When using an unfamiliar area of such an application, even expert end-users may require assistance.

Often a user is unaware of the knowledge required to complete a particular task until the user is actually required to perform that task. Turning to the help provided by the software application is often unsatisfactory and typically requires a user to seek alternate help resources. Web-based tutorials have proven to be a popular help resource for learning how to perform unfamiliar tasks in complex software because the tutorials allow a user to walk through the steps necessary to complete a desired task. However, even the web-based tutorials have not always provided the assistance needed. At times the tutorial is too fast or skips steps. At other times, the subject matter covered in the tutorial is dissimilar enough from the users own subject matter, that the tutorial becomes ambiguous or unclear and the user is left confused.

In their current form, web tutorials are isolated from the applications that they support. A user is often left trying to correlate the dissimilar subject matter to the tasks the user is trying to learn. However, there are other users in the application community who have similar problems and may have even taken the web-based tutorial already. Some of these users in the community may have additional insight which may be helpful.

As the foregoing illustrates, there is a need in the art to provide a web-tutorial system that integrates a fully-featured application into a web-based tutorial and a more effective way to provide community feedback to enhance and improve the instructional information in web-based tutorials.

SUMMARY OF THE INVENTION

Embodiments presented herein include a method for presenting an online tutorial. This method may generally include providing an interactive tutorial to a user. The interactive tutorial may include both tutorial content specifying steps to perform a task with an application and an application interface associated with the application used to perform the task. This method may also include recording the user interacting with the application interface to perform the task according to the steps specified by the interactive tutorial and augmenting the tutorial content with the recorded user interaction.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
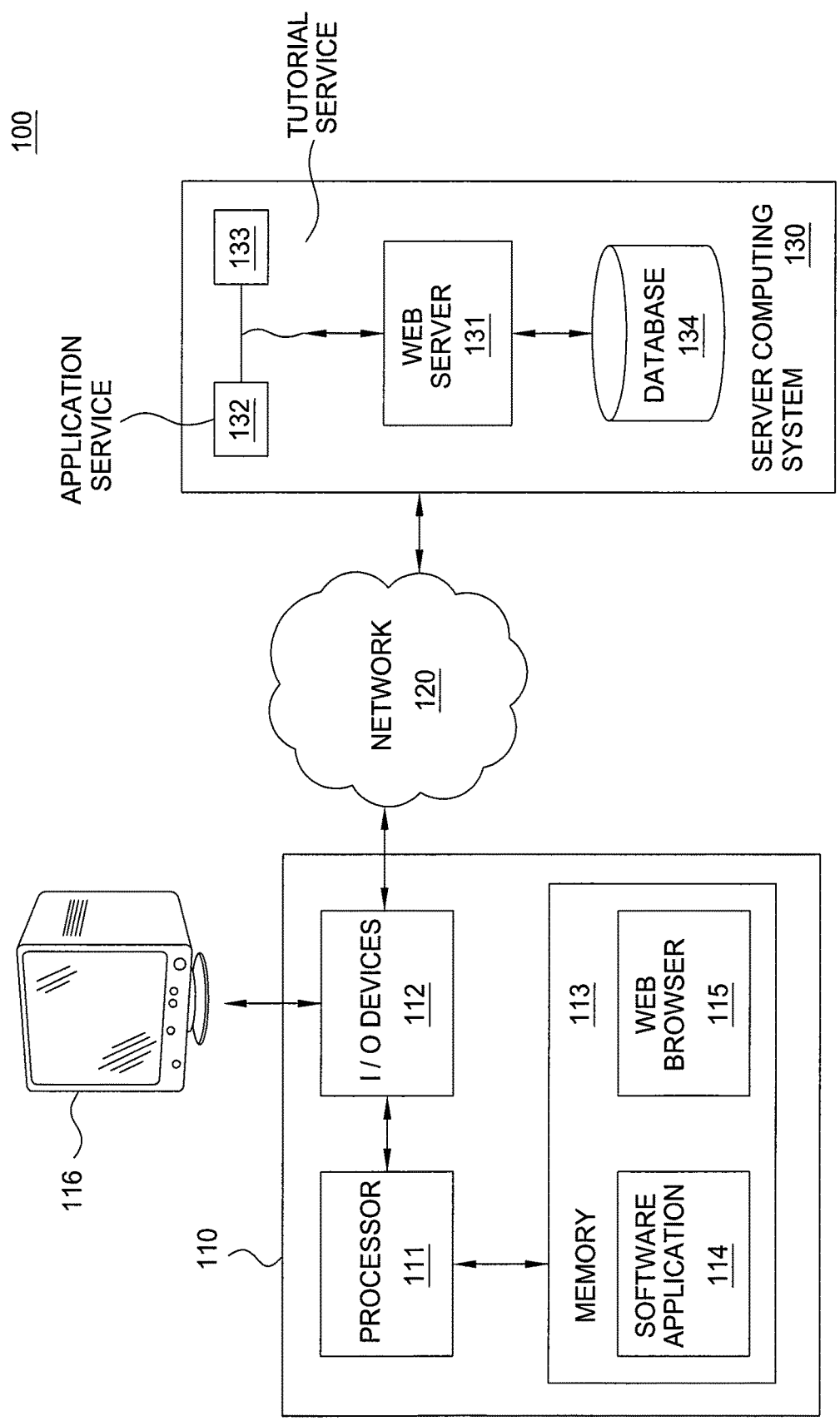
FIG. 1 illustrates an example computing environment providing community enhanced web tutorials, according to one embodiment.

Embodiments of the invention provide techniques for building a community enhanced tutorial system. The community enhanced tutorial system utilizes a novel design space, an Application-in-Tutorial architecture, integrating a full-featured application into a web-based tutorial. In doing so, the community enhanced tutorial system can track when users try to follow the tutorial and can capture video of those users' workflows. Subsequent users can then view the author's original tutorial, or choose from a library of captured community demonstrations for each step of the tutorial. Sorting and filtering mechanisms allow the user to identify demonstrations that may be particularly useful, such as those with similar content to their own, or those that use specific tools. Thus, an original tutorial is provided enhancements from a community of users that are incorporated into the tutorial for each subsequent user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized for storing a program product which, when executed, is configured to perform the methods of the web-tutorial system. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention may be provided to end users through a cloud computing infrastructure. Cloud computing refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. In context of the present invention, a user may access applications (e.g., the web-tutorial system) or related data (e.g., media files) available in the cloud. For example, the web-tutorial system engine could execute on a computing system in the cloud. In such a case, the web-tutorial system could maintain data at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

FIG. 1 illustrates an example computing environment providing community enhanced web tutorials, according to one embodiment. As shown, the environment 100 includes a network 120 connecting a computing system server 130 and a computing device 110. Note, the example environment 100 is included to be illustrative and that other technically feasible configurations fall within the scope of the present invention.

As shown, the computing system server 130 has a web-server 131, an application service 132, a tutorial service 133, and a database 134. The server computer 130 may be a physical computing system (e.g., a system in a data center) or may be a virtual computing instance executing within a computing cloud. In any event, the computing system 130 hosts web-server 131 is accessed by clients using computing device 110, e.g., a laptop or desktop computer. For example, the application service 132 may be provided by software as a service (SaaS) while the web-server 131 exists on a single physical computing system server 130.

Computing system 110 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing system 110 includes, without limitation, a processor 111, input/output (I/O) devices 112, and a memory 113, and is configured to run a software application 114, and a web-browser 115 that reside in memory 113. Computing system 110 is configured to receive input from an end user via I/O devices 112, and is further configured to display graphical images and/or video to the end user via I/O devices 116.

Processor 111 may be any suitable processor implemented as a central processing unit (CPU), a graphics processing unit (GPU), an application-specific integrated circuit (ASIC), a field programmable gate array (FPGA), and/or another type of processing unit. Processor 111 is configured to execute program instructions associated with a particular instruction set architecture (ISA) specific to processor 111, including software application 114 and web browser 115. Processor 111 is also configured to receive data from and transmit data to I/O devices 112 and memory 113. For example, processor 111 may periodically deliver pixel data to a display device 116 with an analog or digital signal.

I/O devices 112 include devices that may be used to input data to computing system 110 or devices that output data from computing system 110. I/O devices 112 may include input devices, such as a joystick, a switch, a microphone, a video camera, a keyboard, a mouse, a touchpad, an interactive pen display, and/or a pen tablet, among others. I/O devices 112 may also include one or more output devices, such as a display screen, a speaker, a projector, among others. In addition, I/O devices 112 may provide input data to or receive output data from computing system 110, such as an Ethernet port, a serial port, a compact disc (CD) drive, or a digital video disc (DVD) drive, among others.

I/O devices 112 also include display device 116. Display device 116 may be a computer monitor, a video display screen, a display apparatus incorporated into a hand held device, any conventional CRT or LED monitor. In some embodiments, display device 116 is a terminal window displayed on another display device, such as a video display window that has been opened by web browser 115.

Network 120 may be any technically feasible type of communications network that allows data to be exchanged between computing system 110 and external entities or devices, such as a hosted website on server computing system 130. Examples of network 120 may include a wide area network (WAN), a local area network (LAN), a wireless (WiFi) network, and/or the Internet, among others.

Memory 113 may be a hard disk, a flash memory stick, a compact disc read-only memory (CD-ROM), a random access memory (RAM) module, or any other type of volatile or non-volatile memory unit capable of storing data. Memory 113 includes various software programs that can be executed by processor 111, including software application 114, and web-browser 115, of which are described in greater detail below.

Early human-computer Interaction (HCI), involving the study, planning, and design of the interaction between people (users) and computers, recognized the challenge of providing effective help systems for software applications.

Today, task-centric documentation is found most commonly in the form of web-based tutorials. Recent work examining how web tutorials are used has shown that they serve as help while performing a task, as resources for re-fining a user's skill set, or as guides that allow a user to perform a workflow beyond their current ability.

Presently, designs for tutorial systems consider:
1. The "scope" which covers the focus of the tutorials
2. "Interactivity" describes how the learning material is used. I.e. The material may be viewed passively. The material may be available for actively used. Or the material may be aware of a user's interactions and even respond users actions reactively.
3. The "integration" of tutorials can be provided via text or in-application Here is introduced a fourth consideration for tutorial systems, the "Architecture". The architectures identified below are distinguished based on the degree of integration between the tutorials and software applications, and the domain in which the tutorial system and application are located: the desktop or the web. The degree of integration between the tutorial and application is significant because it affects how much the two can interact with one another. The domain is also significant because of the qualitative differences between the web and the desktop. The desktop is a personal domain of software maintained by the user, while the web is a social domain of software maintained by others. The web represents a community of users with a wealth of knowledge.

Figure 2:
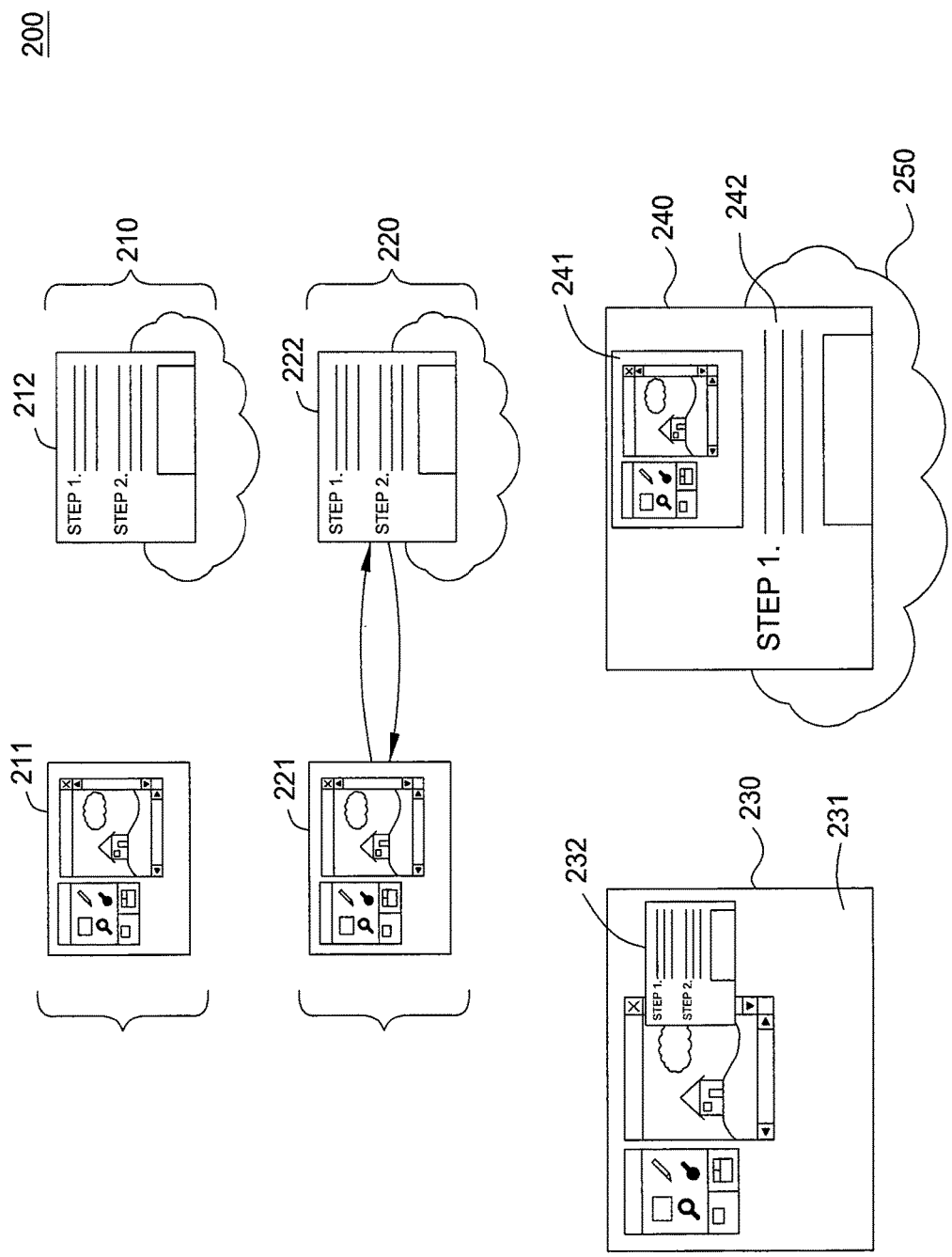
FIG. 2 illustrates current and potential architectures for linking web-based tutorials and applications, according to one embodiment.

FIG. 2 illustrates current and potential architectures 200 for linking web-based tutorials and applications, according to one embodiment. Potential architectures 200 include an isolated architecture 210, a connected architecture 220, a tutorial-in-application architecture 230, and an application-in-tutorial architecture 240. The isolated architecture 210 includes an application 211 and a tutorial 212. The connected architecture 220 includes an application 221 and a tutorial 222. The tutorial-in-application architecture 230 includes an application 231 with an embedded tutorial 232. The application-in-tutorial architecture 240 includes a tutorial 242 with an embedded application 241 in a network environment 250.

The isolated architecture 210 is a conventional or current architecture and does not provide a link between the application 211 and the tutorial 212. The application is basically "dumb" in that it is not aware of the tutorial. As a user goes from step 1 to step 2 in the tutorial 212, the application 211 is unaware of the progresses. In this architecture, the tutorial 212 and application 211 are in their separate domains (the web and desktop respectively), and cannot communicate with one another. This is typical for current web tutorials 212, which users follow in a browser window separate from the application 211. The isolated architecture 210 is only presented here so as to distinguish it from the application-in-tutorial architecture 240.

The connected architecture 220 is a conventional or current architecture which does provides a link between the application 221 and the tutorial 222. In this architecture, the tutorial 222 and application 221 still reside on the web and desktop respectively, however there is communication between them. One-way communication could be used to load an initial document into the application 221 or to customize the application 221 interface to suit the tutorial 222. It could also be used to repurpose tutorial 222 as auxiliary input devices for an application 221. A two-way communication channel enables a reactive tutorial 222 that respond to a user's actions in the application 221 as they follow the tutorial 222. Communication between the application 221 and tutorial 222 also enables tutorial analytics, where logs of actions in an application 221 are reported to the server hosting the tutorial 222. Again, the connected architecture 220 is only presented here so as to distinguish it from the application-in-tutorial architecture 240.

The tutorial-in-application architecture 230 integrates the tutorial 232 into the application 231. In this architecture, the tutorial 222 and application 221 reside in the same domain on the desktop. This architecture allows a tutorial 232 to be presented in context and to quickly and easily react to user actions. However, the tutorial 232 loses the benefits of having a web-presence. This includes the ability to collect web analytics, the ease with which other relevant materials can be accessed through a web search, and the simple mechanisms for sending content to other users. The tutorial-in-application architecture 230 also removes the potential to earn recognition or ad revenue for authors. Again, the tutorial-in-application architecture 230 is only presented here so as to distinguish it from the application-in-tutorial architecture 240.

The application-in-tutorial architecture 240 includes a tutorial 242 with an embedded application 241. Instead of integrating a web based tutorial 232 into an application 231 on the desktop, the application 241 is integrated into the tutorial 242 running on the web. Doing so enables qualitatively new interactions between a tutorial and an application. A user can perform a web search for the task they want to perform, and access a page that serves as both a tutorial 242 for the task and a ready-to-use application 241 tailored to the task.

The application-in-tutorial also provides a convenient gathering place for a community of users to discuss techniques or experiences with performing those tasks. An application-in-tutorial 240 architecture allows developers to create tutorials 242 that improve with use and contributions from the user community. This idea is expanded upon in the FIG. 3 through 5.

Figure 3:
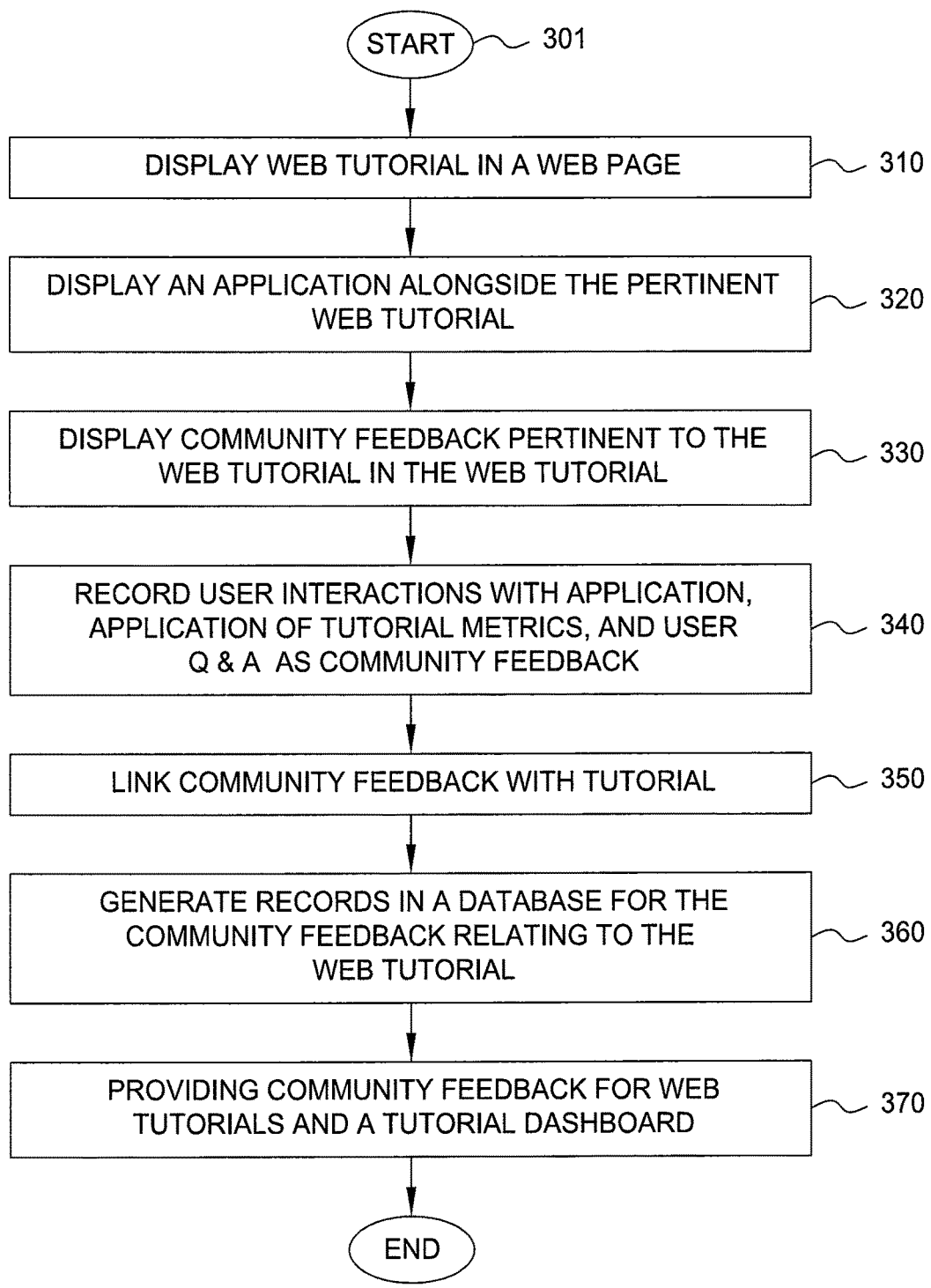
FIG. 3 is a method for capturing community feedback for enhancing a web-based tutorial, according to one embodiment.

FIG. 3 is a method 300 for capturing community feedback for enhancing a web-based tutorial. As shown, the method begins at step 310, where a web-based tutorial is displayed in a web page. In one embodiment, the tutorial is a text based tutorial in which a user follows instructions offered in the tutorial step-by-step. Alternatively, the tutorial is an audio-visual presentation which allows a user to learn the steps necessary for completing a task. The tutorial is capable of communicating with other web enabled content.

In step 320, an application pertinent to a web tutorial is displayed alongside the web tutorial as an application-in-tutorial. As an example, the application may provide a full featured image editing application. More generally, the application is a software application used to perform a task. The application may be hosted by a server or a cloud on the network and made available for the client computer accessing it. In one embodiment, the application is embedded in the web page.

Figure 4:
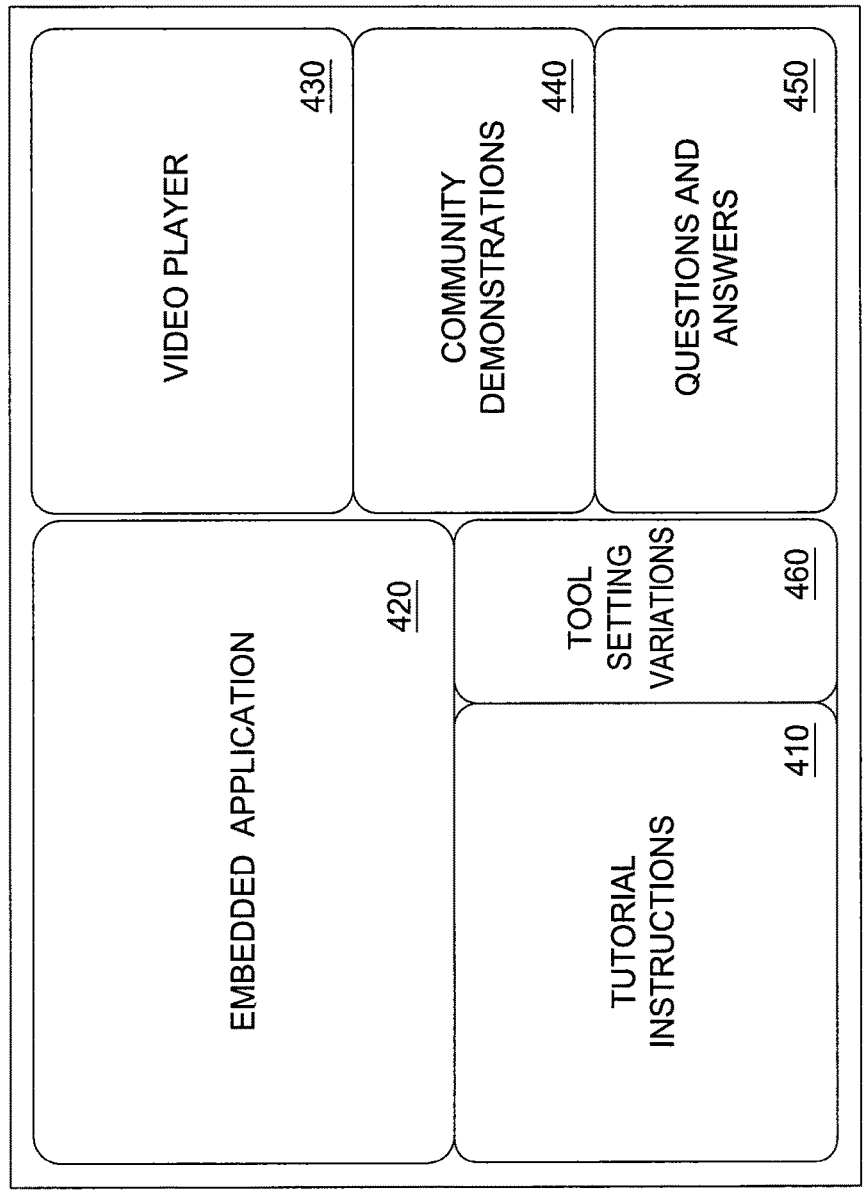
FIG. 4 illustrates an example community enhanced web-based tutorial, according to one embodiment.

In step 330, community feedback pertinent to the web tutorial is displayed in the web tutorial. The community feedback is provided in a space such that the application and the tutorial are visible together. Community feedback includes demonstrations, comments, questions and answers, tool settings, and other metrics relating to the tutorial and recorded from previous use of the tutorial submitted by other users of the application. FIG. 4 provides an example layout for this display. For example, a demonstration of a previous user who attempted to complete the tutorial is made available. Each step of the tutorial is linked to a video clip, presented to a user progressing through a tutorial. Additionally, for each step, in the tutorial tool settings are displayed along with the variances in the settings by the users who previous took the tutorial.

In step 340, the tutorial system records user interaction with the tutorial. As a user moves through the steps of the tutorial in the application, a video clip is generated showing the user interaction in the application for each of the steps. The video clip can be accessed by future tutorial takers to see how someone else may have performed the steps. The user may also want to review what they had done in order to isolate their mistakes made while performing the task. Additionally, settings for tools used while performing the steps of the tutorial are recorded. The question a user asks the tutorial community, in the community feedback space, regarding a tutorial task, as well as the answers from the community (Q&A), are recorded as part of the community feedback. Metrics are also recorded for the tutorial to ascertain the difficulty of a user completing the tutorial successfully. The Q&A and metrics help determine where users encountered trouble or may have given up. The recorded information is used by the author to enhance the tutorial by seeing how users performed the tutorial at each step.

In step 350, the tutorial system links the community feedback to steps of the tutorial. That is, the information gathered and recorded in step 340 is sequentially linked to the individual steps in the tutorial. For example, while performing a particular step in the tutorial, a user has available to him in tutorial all the questions and answers, the tool settings, as well as past user's interactions in the application. In this way, a particular step is associated with all these items. Additionally, the metrics captured by the tutorial system is also associated with the step. For example, assume the tutorial system is being used to learn how to color in a drawing program. During one particular step of the tutorial, the user follows instructions in the provided application. Upon completing the step, the tutorial system saves the user interactions with the application and links it with the step in the tutorial.

In step 360, records are generated in a database for the community feedback relating to the tutorial. The information gathered and recorded in step 340, and linked to the tutorial in step 350, produces data to include in the tutorial system. In step 370, the tutorial system provides the data to a tutorial. Users subsequently taking the tutorial are provided this data to supplement information provided by the tutorial author. For example, a question and answer from a previous user and linked to a step in the tutorial could be displayed to subsequent users of the tutorial during that step of the tutorial. For example teaching a user how to color in a drawing program could have small video clips of previous users attempting and completing individual tasks. The video clip may display the step performed on data similar to that of the current users. For example, the demonstration may have been about coloring using a car. However the current tutorial user may wish to learn how to color a flower. During a drawing fill step, the current user notices a previous user did the same step with a flower. The current user is presented with video captured of the prior user interacting with the tutorial to perform a more similar task than the original tutorial content. That is, rather than present the original tutorial with showing how to perform drawing using the car, the user is presented with community generated tutorial content showing how the drawing fill step is performed on a flower.

Settings altered by a user and recorded by the system could be available for the user, allowing a current user to decide it is something which may be helpful. Deviations on tool settings are recorded and the ranges of settings are provided for the current user. The current user may choose to copy one of these setting or make a new setting. For instance, in the tutorial system to learn how to color in a drawing program, the current user may be provided tool settings for the level of transparency of the fill in the step. However, the user may decide to make the fill more or less transparent. This variation in the transparency setting is recorded in step 340, for future tutorial users.

Additionally, in step 370, the metrics and community feedback is provided to the tutorial author in a tutorial dashboard. The dashboard can track per-step questions and answers, or visualize how users progress through a tutorial including where they encounter trouble or give up. The tutorial author uses this information to enhance the tutorial by seeing how users performed at each step. In one embodiment, changes are made to the tutorial, based on information provided in the database relating to the tutorial, which enhances a tutorial problem step by better explaining or showing more details for the particular step.

One skilled in the art will recognize that the steps can be performed in a sequence out of the order presented in method 300. Additionally the steps of method 300 may be repeated or omitted altogether by the tutorial system or by the user performing the tutorial.

FIG. 4 illustrates an example community enhanced web-based tutorial, according to one embodiment. As shown, diagram 400 depicts a display space broken up into six smaller component spaces. The component spaces include spaces for tutorial instruction space 410, embedded application space 420, video player space 430, community demonstrations 440, questions and answers space 450, and tool setting variations space 460.

The tutorial instruction 410 provides written steps to perform a task associated with the embedded application 420. The tutorial instruction 410 may be text, graphics, or a mix of text and graphics. In one embodiment, the tutorial instruction 410 provides an interface in which a user pages through individual steps.

The embedded application 420 is a program directed to and provided by the web based tutorial. The embedded application 420 functions identically to a desktop version for the program. The embedded application 420 may be a drawing program, video editing program, word processing program, or other software program which may benefit from a tutorial system.

The video player space 430 shows a user how to perform a step in the tutorial instruction space 410. In one embodiment, the video player space 430 defaults to the video designated by the tutorial author. The default video, provided in the video player space 430 for a particular tutorial instruction space 410 step, could have been provided by a tutorial author along with the tutorial when it was initially created. Further, the tutorial author may revise the tutorial after several users have taken it and make a recording of user interaction with the application performed while taking the tutorial the default video for a given tutorial. Recorded videos of computer application behavior can also contain author (or community member) narration.

A step presented in the tutorial instruction space 410 may have multiple videos associated with it. In such a case the videos may be displayed as thumbnails in the community demonstration space 440. The thumbnails depict recorded demonstrations from previous users performing the step from the tutorial instructions space 410. The video player space 430 plays a video from a provided list of videos which demonstrate a particular step in the tutorial. For example, a user performing a tutorial step looks through video thumbnails demonstrating that step in the window displaying the community demonstration space 440. The user clicks on the thumbnail to have that video played in the video player space 430.

The diagram 400 provides questions and answers space 450. A user stuck on a step can ask questions and get answers which are recorded and linked to the step in the tutorial. That is, user generated content is used to augment an existing tutorial. Doing so may create a variety of tutorial variations for performing the task taught by a given tutorial. In one embodiment, a previous user's questions and answers relating to a step in the tutorial is displayed in the smaller component space for questions and answers space 450. The information gathered in the questions and answers space 450 is utilized by the tutorial system to enhance the tutorial for future users. For instance, if several users question a step because they do not get the same results, initially an answer can be provided which helps the users accomplish the step. However, the tutorial author can use this information to modify the tutorial to provide the necessary clarity that future users in the community may achieve the proper results.

Variations of the tool settings for a particular instruction are provided in the tool setting variations space 460. Users performing a step of the tutorial instruction space 410 in the embedded application space 420 are free to deviate from the instructions and also modify tool settings based on the data chosen for the tutorial and user preferences. The variations for settings of the tools used in a step are displayed in the tool setting variations space 460. The current user settings are displayed in conjunction with the range of settings other users had used.

However, the diagram 400 is only one conceptual diagram and one knowledgeable in the arts may optimize the community enhanced web-based tutorial in a number of ways. For instance, a tutorial author may choose to take advantage of additional user peripherals. For example, a user with dual displays may be presented with a community enhanced web-based tutorial with the smaller components spread out across the two display spaces in alternate manner. Such as the embedded application may be in its own space on the second display. Alternately, a tutorial author may determine a different number of smaller component spaces for an embedded application and community feedback in a tutorial. The diagram 400, and the smaller component spaces, are described in detail below.

Figure 5:
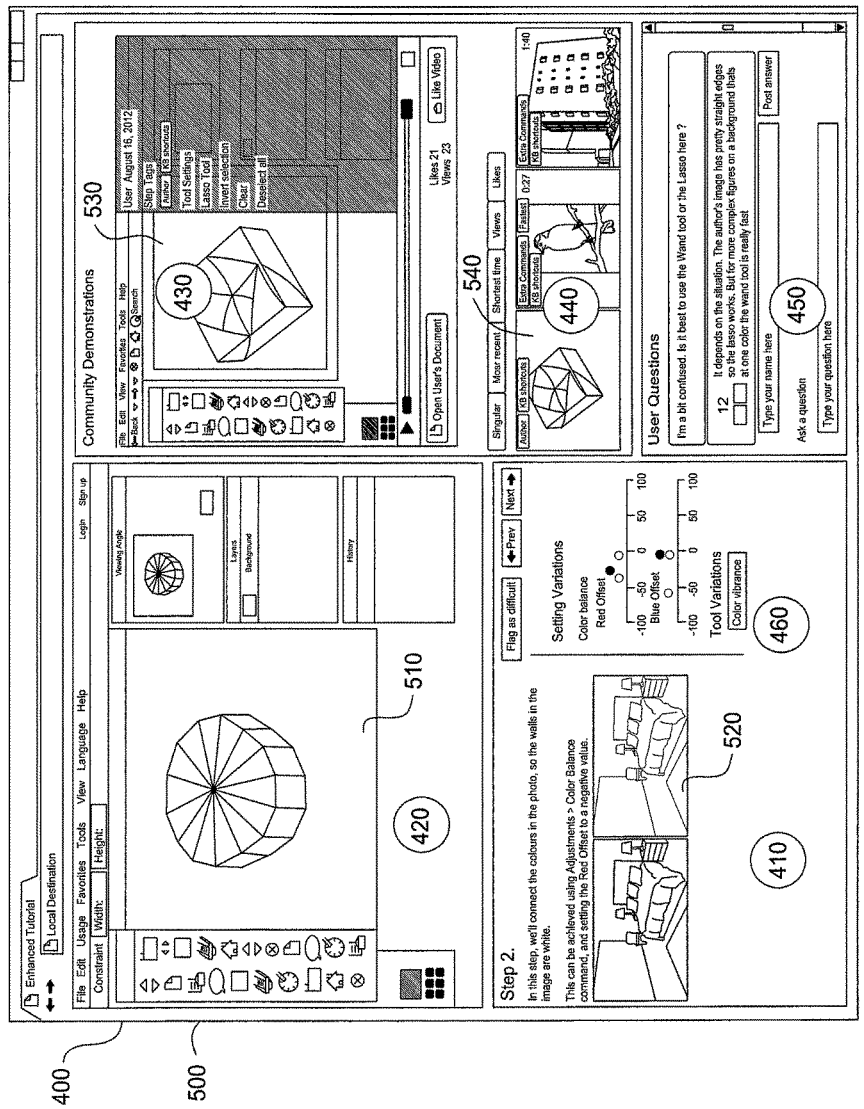
FIG. 5 illustrates an interface for a community enhanced web-based tutorial, according to one embodiment.

FIG. 5 illustrates an interface 500 for the community enhanced web-based tutorial, according to one embodiment of the present invention. The example interface uses the architecture shown in diagram 400 illustrated in FIG. 4.

As shown, a drawing program is provided as the embedded application space 420. The tutorial is at step 2 in the tutorial instruction space 410. The user views a video 530 associated with step 2. The video 530 in the video player space 430 is different than the FIG. 520 in the step 2 in the tutorial instruction space 410 and the data 510 provided in the embedded application 420. However, as shown, the video 530 is made available from the author of the tutorial and is selectable from thumbnail 540 in the community demonstration space 440. For data 510 being edited in the embedded application space 420, setting variations space 460 displays deviations in tool settings for previous tutorial users who used the data 510 in the embedded application space 460 while working on step 2.

The content of the embedded application space 420 depends on the subject matter for the web tutorial. For instance, if the tutorial is for drawing in a specific drawing program, that drawing program is provided in the web tutorial as the embedded application 420. In one embodiment, the embedded application 420 remains constant for the duration of a tutorial. Alternatively, the embedded application 420 may depend on what step a user is working on. That is, different steps in a tutorial might use different programs to perform particular tasks. In such case, the embedded application space 420 associates the program with a tutorial step and changes the program as a user moves to a step associated with a different program. This may be done to present a tutorial which involves several related software applications that function together. One such example may be an entertainment creation suite.

Figure 6:
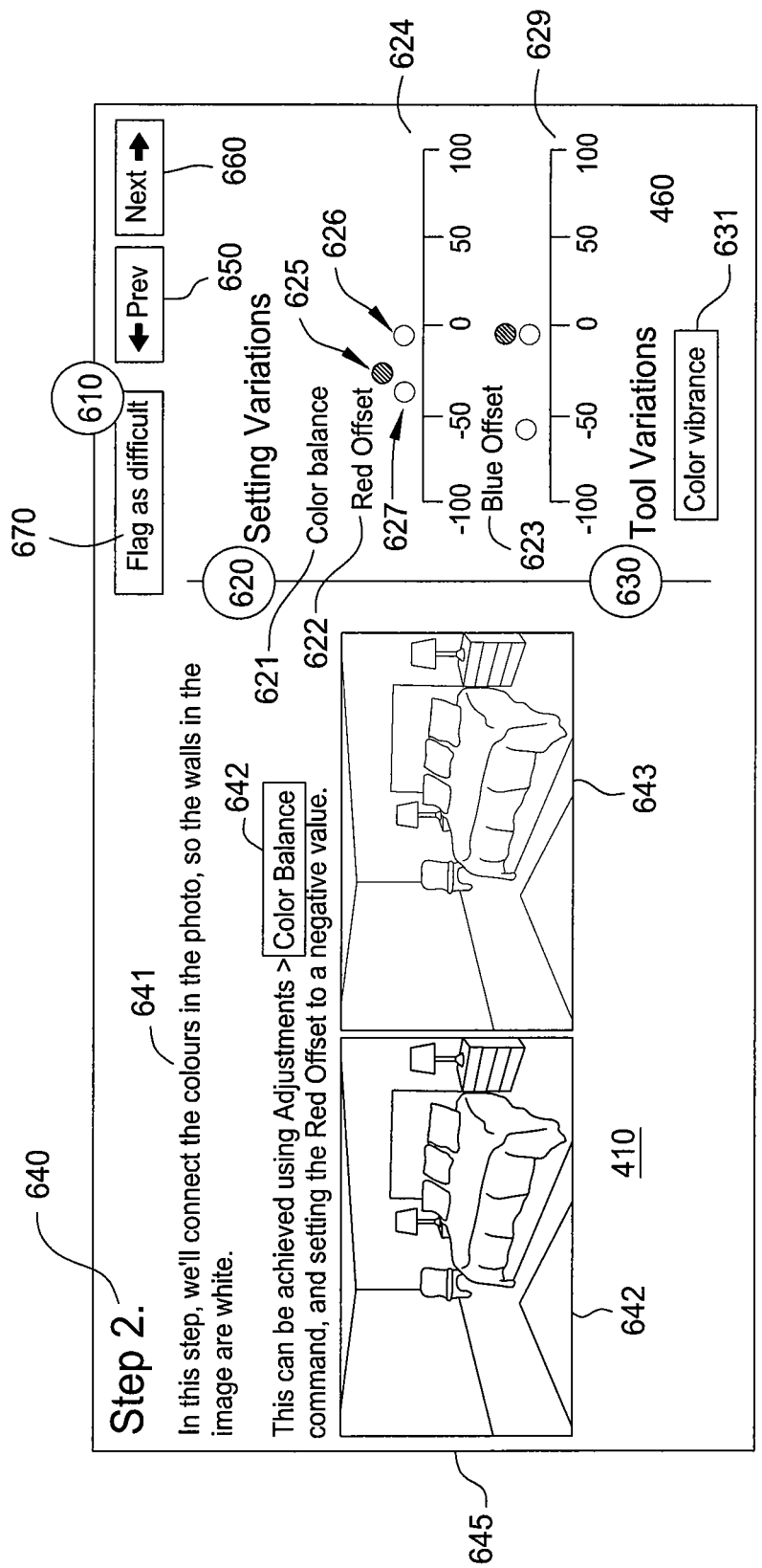
FIG. 6 illustrates text and image instructions provided in the interface of the community enhanced web-based tutorial, according to one embodiment.

FIG. 6 illustrates the tutorial instruction space 410 provided in the example interface 500 of the community enhanced web-based tutorial, according to one embodiment. The tutorial instruction space 410 has a title 640, instruction text 641, and images 645. The text 641 describes the use of tools 642. The images 645 show a before 642 and after 643 for the step. Additionally, the tutorial instruction 410 has a previous button 650 and a next button 660 to advance and go back in a step of the tutorial. Switching steps through the previous button 650 and a next button 660 alters the video displayed in the community demonstration 440 to match the step in the title 640. The tutorial instruction space 410 includes a "flagged as difficult" button 670 to flag steps in a tutorial as such.

FIG. 6 also illustrates the tool setting variations space 460 provided in the example interface 500 of the community enhanced web-based tutorial, according to one embodiment of the present invention. The tool setting variations space 460 include setting variations 620 and tool variations 630. In the example provided, the setting variations 620 include a color balance 621 which has a red offset 622 and a blue offset 623. The red offset 622 has a settings scale bar 624 showing previous users the upper range 626 and lower range 627 as well as a recommended user setting 625. The blue offset 623 has a settings scale bar 629. The tool variations 630 include a color vibrance tool 631.

The text 641 describes the steps a user needs to perform to complete a particular task (namely, the subject of the tutorial). In one embodiment, a user begins step 2 as show in the title 640. The user reads through the text 641, describing the steps to be taken and views the images 645 showing a before 642 and after 643 for those steps. In this particular example, the text 641 describes the adjustment of the color balance 642. From the setting variations, the user is able to see the recommended setting 625 as well as the upper range 626 and lower range 627 used previously in this tutorial step. In the tool variations 630, a previous user used the color vibrance tool 631 to increase the intensity of the muted colors while leaving the saturated colors alone. Thus the community of users has suggested variations in the tutorial which may benefit the current user. The current tutorial user may adjust the color balance 621 or utilize the color vibrance tool 631 and compare the user results to the results to the image after 643 completion of the tutorial step. After completing this tutorial step, the user selects next button 660 to proceed to the following step. Alternately, the user may select previous button 650 to review steps taken (or flag the particular step as difficult using button 670).

A flag-as-difficult button 670 provides metrics for the tutorial steps. An author examines the steps having difficult flags 670. Setting variations 620, tool variations 630 and other community feedback linked to a particular tutorial step is available to the author as tools for enhancing the tutorial.

Figure 7:
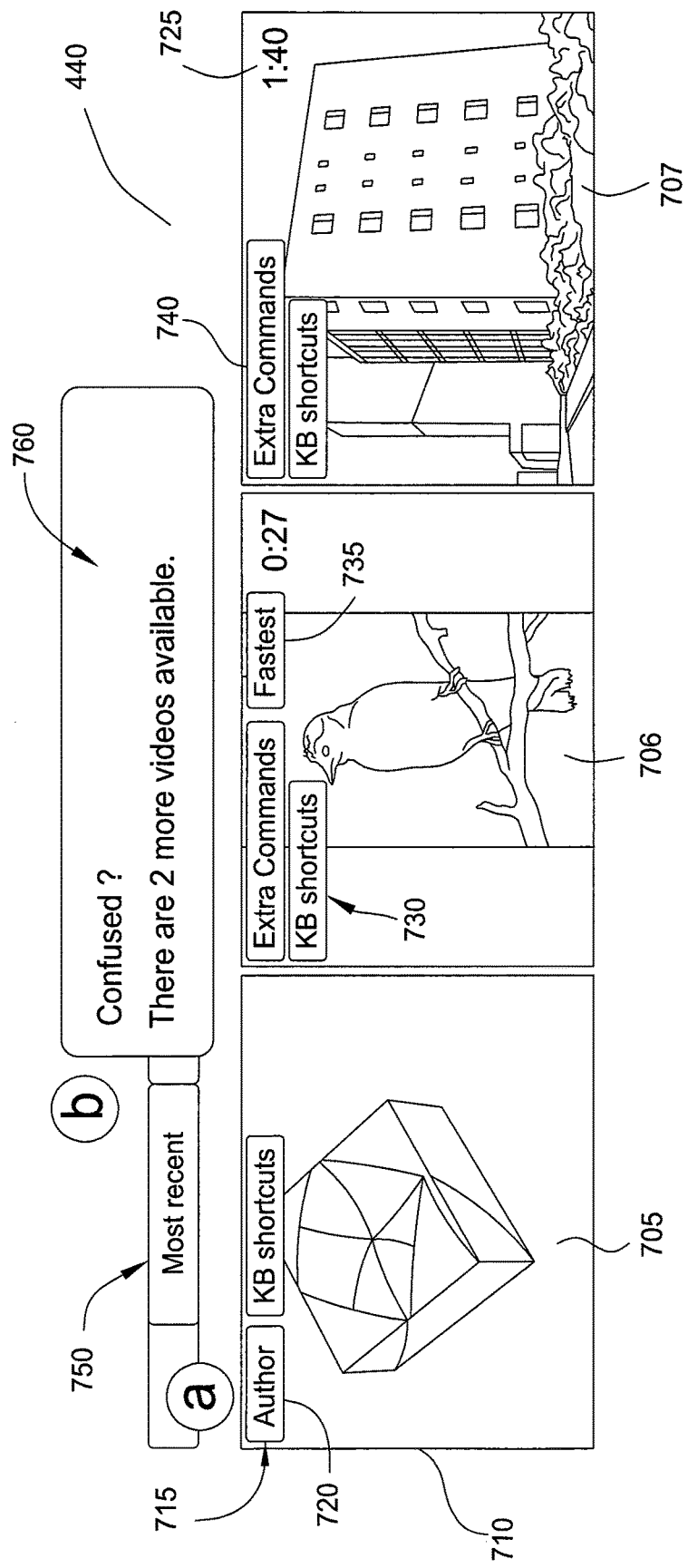
FIG. 7 illustrates an interface of the community enhanced web-based tutorial, according to one embodiment.

FIG. 7 illustrates the thumbnails 710 showing available demonstrations in the community demonstration space 440, according to one embodiment. The available community demonstration space 440 includes a sort 750 feature, thumbnails 710 and adaptive popups 760. The thumbnails 710 list step tags 715 which are helpful for determining a community demonstration best suited to a user's task. The step tags 715 depict the author 720, time 725, extra commands 740, keyboard shortcuts 730, and duration 735 to name a few. As shown in the current example, the thumbnails 710 list 3 videos, the first thumbnail 705, the second thumbnail 706 and the third thumbnail 707.

The demonstration videos, as represented by the thumbnails 710, are submitted by the author of the tutorial and other users in the community. The thumbnails 710 are links to demonstrations related to the tutorial step. As shown, the first thumbnail 706 is provided by the author 720. The first thumbnail 706 is currently directed to the video playing in the video player 430. Selecting the first thumbnail 706 causes the video linked to it to be played in the video player 430.

The order of the thumbnails 710 is determined by how they are sorted. The community demonstrations 440 provide a number of features to help a user find a video (thumbnail 710) to match their particular situation or needs. The sort 750 feature provides a listing of the thumbnails based on similar content, most recent submission, shortest time, number of views, and the number of likes. However, the parameters for sorting are endless and it should be obvious to one skilled in the art that creating an additional sort parameter is within the scope of this invention. In one embodiment a user elects to sort the thumbnails on similar content. The similarity tab of the sort 750 feature finds and compares the user open document in the embedded application 420 to the community provided user demonstrations. For example, for an image editor application, known algorithms for content-based image retrieval could be used.

Additionally, the thumbnails 710 can be filtered. For instance, the thumbnails 710 can be filtered with the step tags 715 to only provide links with keyboard shortcuts 730. Filters may also be applied from other components of the tutorial system. The thumbnails can be filtered on settings 620 and tools 630. Doing so allows videos directed to the same tasks using the same tools to be readily identified. In one embodiment, a user filters for a video to be played in the community demonstration space 440 which uses the color vibrance tool 631. Clicking on the tool causes the thumbnails 710 submitted by the community of users to be filtered in a manner in which the thumbnails 710 presented to the user all use the vibrance tool 631 somewhere in the video.

In the example shown in FIG. 7, a popup 760 reminds users that additional demonstrations are available. A popup 760 can be used to provide reminders, tips, general information or warnings. The display space may limit the number of visible thumbnails 710. After filtering the community provided videos for use of the color vibrance tool 631 and sorting for similar content, popup 760 notifies the user that there are two additional videos not shown.

Figure 8:
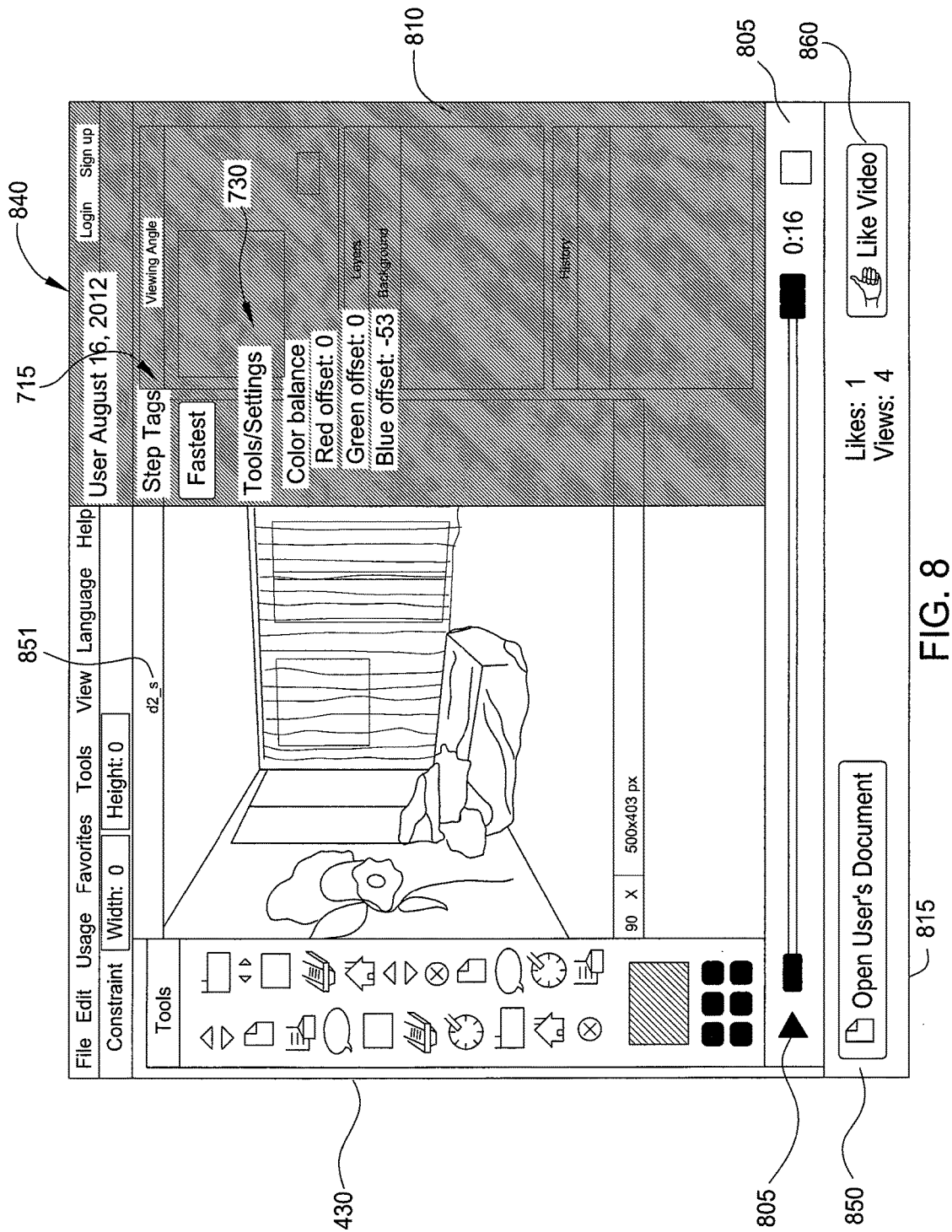
FIG. 8 illustrates an overlay of a video player provided in the interface of the community enhanced web-based tutorial, according to one embodiment.

FIG. 8 illustrates the video player 430 provided in the example interface 500 of the community enhanced web-based tutorial, according to one embodiment. The video player 430 includes a command bar 805, an overlay 810, and a community link bar 815. The video player 430 is configured to play video 851. The command bar 805 includes a play button 805 (which toggles with a pause button) and other typical video player controls. The overlay 810 includes an identifier 840, and metadata for the step tags 715 and the tool/settings 830. The community link bar 815 includes a like button 860 and an open user's document button 850.

Pausing the video 851 activates overlay 810. The top of the overlay 810 provides an identifier 840 for the video 851. The identifier 840 may contain a number of fields. As shown, the identifier 840 provides an author name and the date the video was created. The identifier 840 displays a creator named "User" and a creation date of Aug. 16, 2012. Additionally, the overlay 810 displays step tags 715. The step tags are linked to the thumbnails 710. Additionally, step tag 715 identifies video 851 as the "fastest". Tools/Settings 830 provides a listing of the tools and settings used by the creator of the video 851. In this example, video 851 was created with color balance settings of: Red Offset of 0; Green Offset of 0; and Blue Offset of negative 53. This allows a user to see what settings were used to obtain the particular results presented in tutorial content.

The community link bar 815 includes a like button 860 for ranking the video. In this example, the ranking is provided on the community link bar adjacent to the like button 860. The information is also provided to the sort feature 750. For example, a user finding video 851 to be helpful may chose to provide feedback by clicking on the like button 860. The more likes, the higher the rank. The ranking information is then provided to subsequent users to help them determine if a video may be worth viewing. This information is also useful to the tutorial author who may incorporate aspects of the video 851 in the tutorial.

The community link bar 815 also contains an open user's document button 850. This button opens the document in the embedded web application 420. Thus starting a tutorial by synching to a community provided demonstration video 851. The user can pause the video 851 and view the Tools/Settings 830 to replicate them in the embedded application 420. Using identical data provided in the video player 430 ensures a one for one correlation with tutorial operations performed by the creator of the video 851. As a user progresses through the video 851 mimicking the operations in the embedded application 420, the user can check that the results are the same. Thus ensuring the user did not miss something. Additionally, if the video 851 skip a step, the user can discover that step by comparing the display of the video 851 with the display of the embedded application 420. In one embodiment, the user synchs the data between the demonstration video 851 and the data in the embedded application 420 by selecting the open user document button 850.

Traditional tutorials are created and do not change once posted. Tutorials evolve and become better through usage and community feedback utilizing the system and techniques provided here. The initial posting of the tutorial acts as a seed and as community content in the forms of demonstrations, comments, questions and answers etc, accumulate, the tutorial becomes more pertinent to users whose goals did not match the original tutorial content and overall quality of the tutorial is greatly improved.

In sum, the present application describes a system and techniques for providing a web-tutorial system that integrates a fully-featured application into a web-based tutorial and a more effective way of providing community feedback to enhance and improve the instructional information in the web-based tutorials.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for presenting an online tutorial, the method comprising:
    displaying an interactive tutorial in a web page to a user, wherein the interactive tutorial includes both tutorial content specifying steps to perform a task with an application and an application interface associated with the application used to perform the task, the interactive tutorial comprising a web-based tutorial executing on a network;
    recording the user interacting with the tutorial content to perform the task according to the steps specified by the interactive tutorial;
    augmenting the tutorial content with the recorded user interaction; and
    displaying the augmented tutorial content comprising the recorded user interaction in the interactive tutorial in the web page for access and viewing by other users of a web-based community.

2. The method of claim 1, wherein the application is embedded in the interactive tutorial.

3. The method of claim 1, further comprising:
    providing, as part of the interactive tutorial, community feedback received from a user community for the interactive tutorial.

4. The method of claim 3, wherein the community feedback records a second user performing one or more steps of the tutorial using the application interface.

5. The method of claim 3, wherein the community feedback includes a question posted by the user community related to the interactive tutorial, and answers to the question posted by the user community.

6. The method of claim 3, wherein the community feedback includes commentary contributed by an author of the tutorial.

7. The method of claim 1, further comprising,
    generating, one or more metrics related to the recorded user interaction performing one or more of the steps of the task.

8. The method of claim 1, wherein the application comprises a web-based application embedded in the interactive tutorial.

9. The method of claim 1, wherein the interactive tutorial is configured to communicate with other web-enabled content.

10. A non-transitory computer-readable storage medium storing instructions, which, when executed on a processor, performs an operation for presenting an online tutorial, the operation comprising:
   displaying an interactive tutorial in a web page to a user, wherein the interactive tutorial includes both tutorial content specifying steps to perform a task with an application and an application interface associated with the application used to perform the task, the interactive tutorial comprising a web-based tutorial executing on a network;
   recording the user interacting with the tutorial content to perform the task according to the steps specified by the interactive tutorial;
   augmenting the tutorial content with the recorded user interaction; and
   displaying the augmented tutorial content comprising the recorded user interaction in the interactive tutorial in the web page for access and viewing by other users of a web-based community.

11. The non-transitory computer-readable storage medium of claim 10, wherein the application is embedded in the interactive tutorial.

12. The non-transitory computer-readable storage medium of claim 10, wherein the operation further comprises:
   providing, as part of the interactive tutorial, community feedback received from a user community for the interactive tutorial.

13. The non-transitory computer-readable storage medium of claim 12, wherein the community feedback records a second user performing one or more steps of the tutorial using the application interface.

14. The non-transitory computer-readable storage medium of claim 12, wherein the community feedback includes a question posted by the user community related to the interactive tutorial, and answers to the question posted by the user community.

15. The non-transitory computer-readable storage medium of claim 12, wherein the community feedback includes commentary contributed by an author of the tutorial.

16. The non-transitory computer-readable storage medium of claim 10, wherein the operation further comprises:
   generating, one or more metrics related to the recorded user interaction performing one or more of the steps of the task.

17. A system, comprising:
A processor; and
A memory hosting an application, which, when executed on the processor, performs an operation for presenting an online tutorial, the operation comprising:
   displaying an interactive tutorial in a web page to a user, wherein the interactive tutorial includes both tutorial content specifying steps to perform a task with an application and an application interface associated with the application used to perform the task, the interactive tutorial comprising a web-based tutorial executing on a network;
   recording the user interacting with the tutorial content to perform the task according to the steps specified by the interactive tutorial;
   augmenting the tutorial content with the recorded user interaction; and
   displaying the augmented tutorial content comprising the recorded user interaction in the interactive tutorial in the web page for access and viewing by other users of a web-based community.

18. The system of claim 17, wherein the application is embedded in the interactive tutorial.

19. The system of claim 17, wherein the operation further comprises:
   providing, as part of the interactive tutorial, community feedback received from a user community for the interactive tutorial.

20. The system of claim 19, wherein the community feedback records a second user performing one or more steps of the tutorial using the application interface.

21. The system of claim 19, wherein the community feedback includes a question posted by the user community related to the interactive tutorial, and answers to the question posted by the user community.

22. The system of claim 19, wherein the community feedback includes commentary contributed by an author of the tutorial.

23. The system of claim 17, wherein the operation further comprises generating one or more metrics related to the recorded user interaction in performing one or more of the steps of the task.

* * * * *